United States Patent
Hancock-Bogese et al.

[11] Patent Number: 5,848,771
[45] Date of Patent: Dec. 15, 1998

[54] ONE-PIECE STRAP CLAMP

[75] Inventors: Sharon Hancock-Bogese; Stephen B. Bogese, II, both of Salem, Va.

[73] Assignee: Virginia Plastics Company, Inc., Roanoke, Va.

[21] Appl. No.: 926,868

[22] Filed: Sep. 10, 1997

Related U.S. Application Data

[63] Continuation of Ser. No. 587,592, Jan. 17, 1996, abandoned.

[51] Int. Cl.⁶ .................................................... F16L 3/08
[52] U.S. Cl. ...................................... 248/74.3; 24/16 PB
[58] Field of Search ................................ 248/74.3, 74.2, 248/74.1, 73, 68.1; 24/16 PB, 30.5 P

[56] References Cited

U.S. PATENT DOCUMENTS

| | | | |
|---|---|---|---|
| 3,102,311 | 3/1961 | Martin et al. | 24/16 PB |
| 3,192,584 | 7/1965 | Pape . | |
| 3,473,768 | 10/1969 | Piasecki . | |
| 3,739,429 | 6/1973 | Kohke | 24/16 PB |
| 4,462,141 | 7/1984 | Bogese | 24/168 B |
| 4,735,387 | 4/1988 | Hirano et al. | 248/71 |
| 4,795,116 | 1/1989 | Kohut et al. | 248/73 |
| 4,919,373 | 4/1990 | Caveney et al. | 248/74.3 |
| 5,131,613 | 7/1992 | Kamiya et al. | 24/16 PB X |
| 5,385,321 | 1/1995 | Kume et al. | 24/16 PB X |
| 5,584,452 | 12/1996 | Koike | 248/74.3 |
| 5,601,261 | 2/1997 | Koike | 248/74.3 X |
| 5,630,252 | 5/1997 | Wells | 24/16 PB |

FOREIGN PATENT DOCUMENTS

| | | | |
|---|---|---|---|
| 1480386 | 5/1967 | France | 248/74.3 |
| 1201483 | 8/1970 | United Kingdom | 24/16 PB |
| 2040352 | 8/1980 | United Kingdom | 248/74.3 |

OTHER PUBLICATIONS

Calestani et al Patent; Patent No. Not Available, Published 1962 Country Unknown.

*Primary Examiner*—Ramon O. Ramirez
*Attorney, Agent, or Firm*—Saidman DesignLaw Group

[57] ABSTRACT

A one-piece flexible strap clamp which may be wrapped in either of two directions about barriers, or about objects of varying shape such as insulators or lugs, or around fences, or about linear objects such as cable, wire, or bundles of cable or wire. The clamp may be installed onto a variety of support surfaces, such as underground support arms, wildlife/animal barriers, dielectric covers, or tubular guards, without the need for any additional fasteners or other mounting equipment or pieces, and is more tamper proof than previous versions.

16 Claims, 5 Drawing Sheets

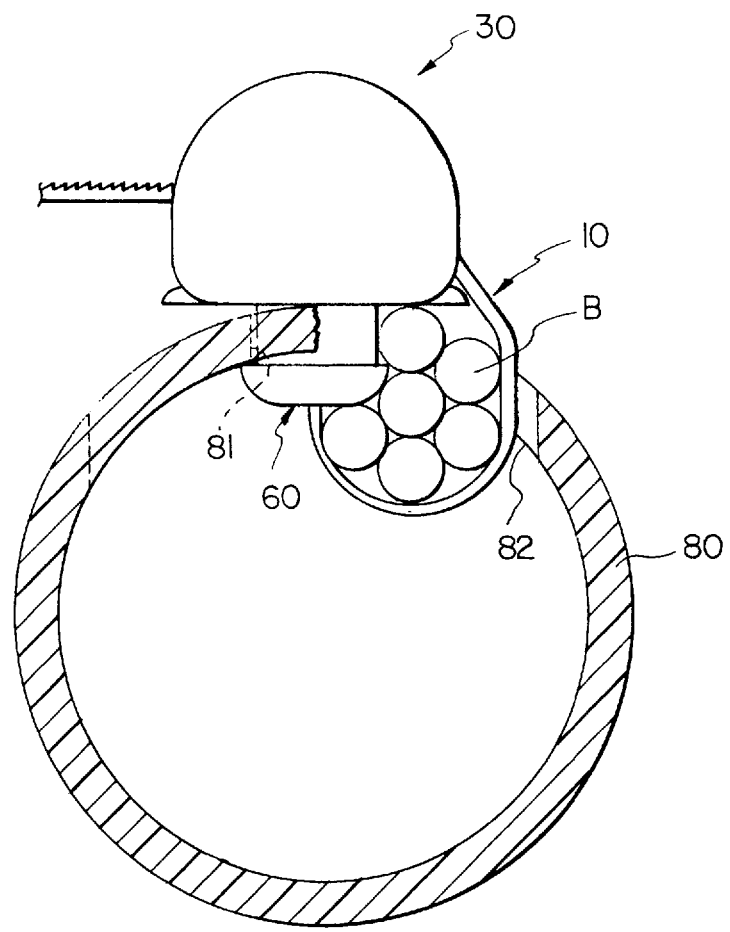

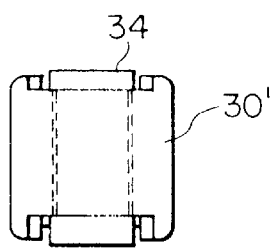
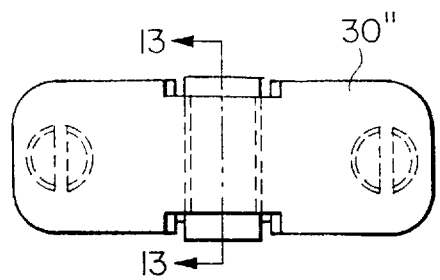
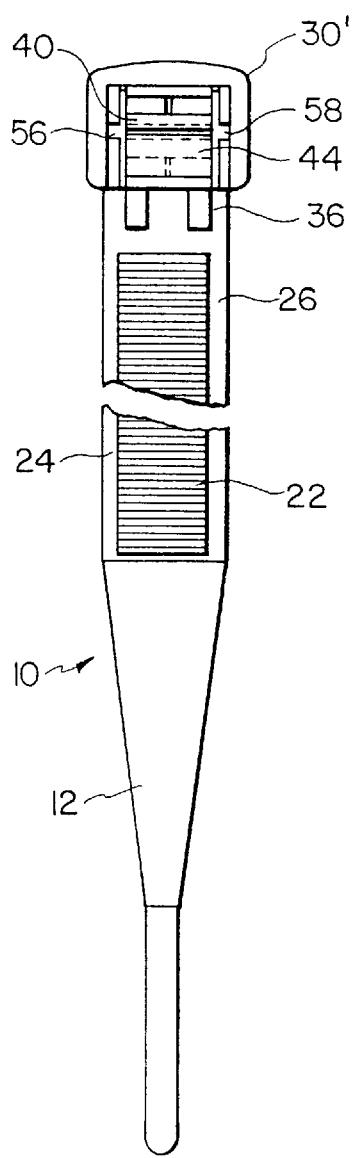
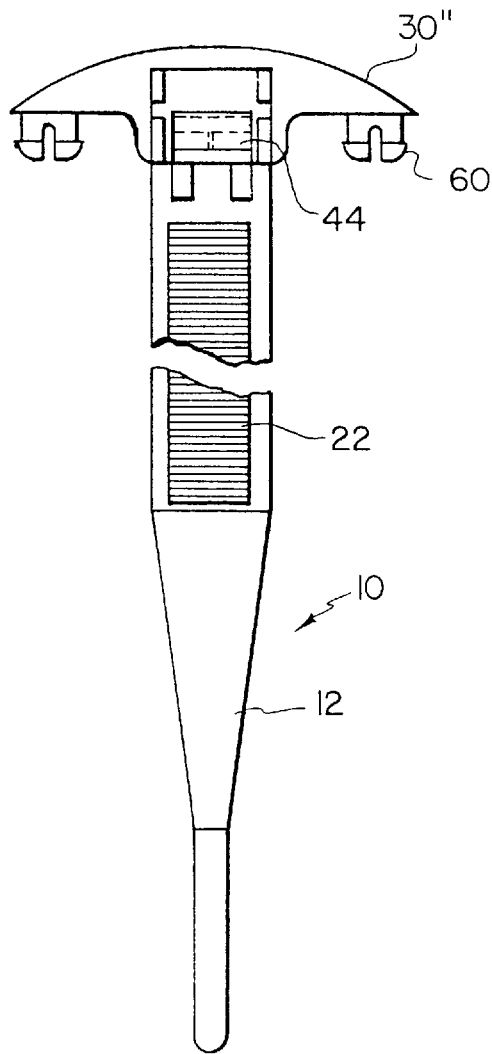

ONE-PIECE STRAP CLAMP

This application is a continuation of application Ser. No. 08/587,592, filed Jan. 17, 1996, now abandoned.

BACKGROUND OF THE INVENTION

I. Field of the Invention

The present invention is related to flexible strap clamps or cable ties and, more particularly, is directed towards a one-piece flexible strap clamp of the type which utilizes a flexible strap having serrated teeth which engage a locking piece formed in a body portion after encircling a cable or similar body.

II. Description of Related Art

U.S. Pat. No. 4,462,141 (assigned to the same assignee as the present invention) describes a flexible locking clamp that is particularly designed for use with a tubular guard for a linear body. The tubular guard typically comprises a guy wire guard which is a long, tubular plastic housing typically having a slit extending along its length so as to permit a linear body, such as a cable, to be inserted therewithin.

The flexible locking clamp described in the '141 patent, although an improvement over the prior art devices then known, nevertheless suffers from several deficiencies.

For one thing, the flexible strap portion includes serration transversely formed along both surfaces of the strap from one edge to the other. After the strap is inserted through the body portion, and the strap's serrations engage the similarly-formed teeth on the locking piece, it is nevertheless possible for someone to insert a screw driver, or similar implement, into the body portion and thereby disengage the strap from the locking piece. Thus, it would be desirable if an improvement could be provided which would render the flexible locking clamp of the '141 patent more tamper-proof.

Another problem with the flexible locking clamp of the '141 patent is that separate fastening pieces, such as rivets 56, must be supplied in order to mount the clamp to the wall of the tubular guard member. In addition to being more expensive, such additional fasteners take more time to install, and complicate, rather than simplify, the overall procedure. It therefore may be appreciated that it would be highly desirable if a locking clamp could be provided which did not require the use of separate fastening members for securing the clamp to a support member.

A further problem with the locking clamp of the '141 patent is that its design is limited for use when clamping a cable in one direction only. That is, the clamp of the '141 patent is not particularly designed to allow a cable to be clamped in either a clock-wise or counterclockwise fashion. Bilateral clamping ability would greatly facilitate field use.

It is towards overcoming the above-noted disadvantages that the present invention is advanced.

OBJECTS AND SUMMARY OF THE INVENTION

It is therefore a primary object of the present invention to provide a new and improved one-piece flexible strap clamp which has the ability to be wrapped in either of two directions (clockwise or counterclockwise) about an object such as a cable or bundle of wires.

Another object of the present invention is to provide a flexible strap clamp that is utilized to secure a body, such as a guy wire, and which may be installed onto a support surface, such as a tubular guard, without the need for any additional fasteners or other mounting pieces.

An additional object of the present invention is to provide a new and improved flexible clamp which is more tamper-proof than prior art versions.

The foregoing and other objects are attained in accordance with one aspect of the present invention through the provision of a one-piece strap clamp which comprises an elongated strap having a front side, a back side, a secured end and a free end. Serrations are formed on the front side only of the strap. A head is connected to the secured end of the strap and includes an aperture formed therethrough to define first and second openings in the head. Finally, means are formed in the head for securing the strap to the head when the free end of the strap is inserted either through the first opening or the second opening.

In accordance with more specific aspects of the present invention, the first and second openings are formed on opposite sides of the head and preferably comprise the opposite ends of the aperture. The strap has no serrations formed on the back side thereof. The aperture preferably includes a top wall and a bottom wall, while the means formed in the head preferably comprises locking means formed in the aperture for interlocking with the serrations whether the strap is inserted through the first opening or the second opening.

In accordance with still more specific aspects of the present invention, the locking means preferably comprises first and second tongues extending respectively from the top wall and the bottom wall of the aperture in the head, each of the tongues including teeth formed thereon. More particularly, the teeth are formed on the lower surface of the first tongue and the upper surface of the lower tongue. The first tongue preferably extends downwardly and rearwardly from the top wall and includes means for enabling same to flex upwardly, while the second tongue preferably extends upwardly and forwardly from the bottom wall and includes means for enabling same to flex downwardly.

In accordance with other aspects of the present invention, there is provided a one-piece strap clamp which comprises an elongated strap having a front side, a back side, a secured end and a free end, serrations formed on the front side only of the strap, a head connected to the secured end of the strap and having an aperture formed therethrough to define first and second openings therein, the aperture having a top wall and a bottom wall, and means formed in the head for securing the strap to the head when the free end of the strap is inserted only through the first opening. The means preferably comprises a tongue having teeth formed thereon, the teeth being formed on the upper surface of the tongue, the tongue extending upwardly and forwardly from the bottom wall and including means for enabling same to flex downwardly.

In accordance with yet other aspects of the present invention, there is provided a one-piece strap clamp for a cable or other body which comprises means for encircling the body including a flexible strap and a head including aperture means for receiving and locking the strap, and means extending integrally from the body for allowing the encircling means to be secured to a support member without the need for any additional parts.

In accordance with more detailed aspects of this embodiment, the means for allowing the encircling means to be secured to a support member comprises mounting foot means extending integrally from the body and adapted for insertion through mounting opening means formed in the support member. More particularly, the mounting foot means comprises a base portion extending from the body and a ball portion connected to the base portion and adapted to be inserted through the mounting opening means.

In accordance with more specific aspects of this embodiment, the base portion is substantially cylindrical and is of a diameter which is less than that of the ball portion. There is further provided slot means formed in the base and ball portions for creating a pair of toe portions that are adapted to flex resiliently towards one another as the ball portion is inserted through the mounting hole means.

In accordance with another aspect of the present invention, the mounting foot means comprises first and second substantially similar mounting feet located at spaced locations on the head, the head including a pair of shoulders extending laterally along both sides of the aperture, while the spaced locations are preferably located one on the underside of each of the shoulders.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which:

FIG. 8 shows the preferred embodiment of the present invention attached to a tubular support member;

FIG. 9 is a top view of an alternate embodiment of the present invention;

FIG. 10 is a front view of the alternate embodiment of FIG. 9;

FIG. 11 is a top view of yet another alternate embodiment of the present invention;

FIG. 12 is a front view of the embodiment of FIG. 11; and

DETAILED DESCRIPTION OF THE PREFERRED EMBODIMENTS

Figure 1:
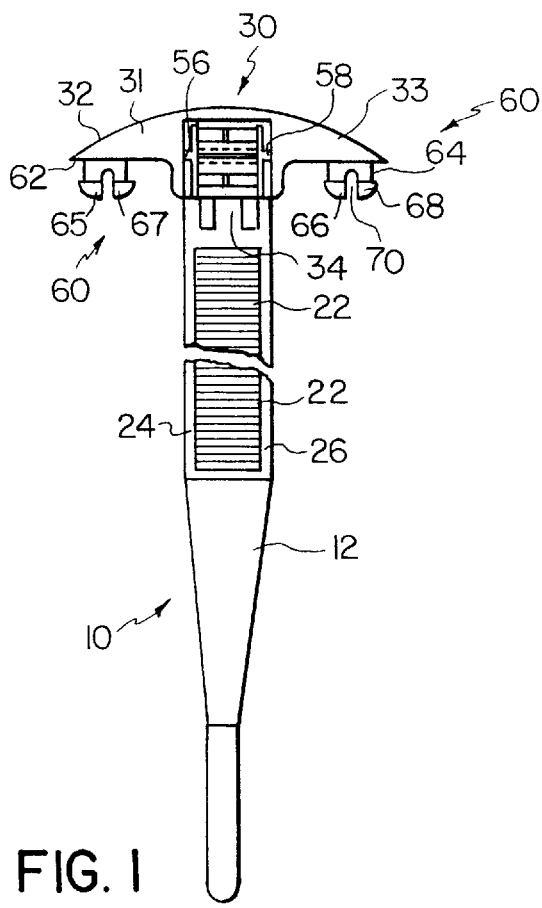
FIG. 1 is a front view of a preferred embodiment of the present invention.

Referring now to the drawings, wherein like reference numerals represent identical or corresponding parts throughout the several views, and more particularly to FIGS. 1–4 thereof, there is illustrated a first preferred embodiment of a one-piece of a strap clamp in accordance with the present invention.

Figure 2:
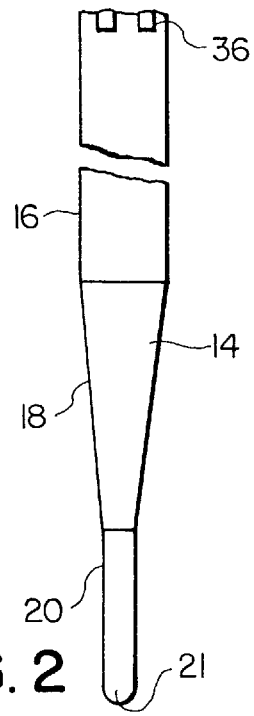
FIG. 2 is partial rear view of the preferred embodiment of the present invention.
Figure 3:
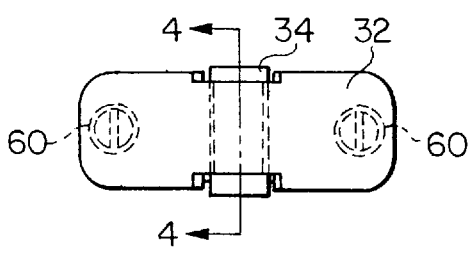
FIG. 3 is a top view of the preferred embodiment of FIG. 1.

The one-piece strap clamp of the present invention generally comprises a flexible strap 10 connected to and extending integrally from a head 30. Strap 10 includes a front side 12 and a back side 14. As seen in FIG. 2, strap 10 preferably, although not necessarily, includes a full width portion 16, a tapered portion 18, and a narrowed width portion 20 which terminates in a free end 21 of the strap.

Located on the front side 12 of strap 10, on the full width portion 16, are a plurality of serrations 22 which, it will be noted, do not extend the full width of portion 16. Instead, a pair of guide rails 24 and 26 longitudinally extend along both sides of serrations 22. As will become more clear hereinafter, rails 24 and 26 serve to render the present invention more tamper-proof by preventing access to serrations 22 when the latter are locked in head 30. It is noted that back side 14 includes no serrations formed thereon.

Head 30 includes a top wall 32 having an outer surface that is curved both laterally and longitudinally. Head 30 preferably includes a pair of shoulders 31 and 33 which are tapered gradually downwardly from the central portion of head 30 laterally along both sides thereof (see FIG. 5).

Figure 4:
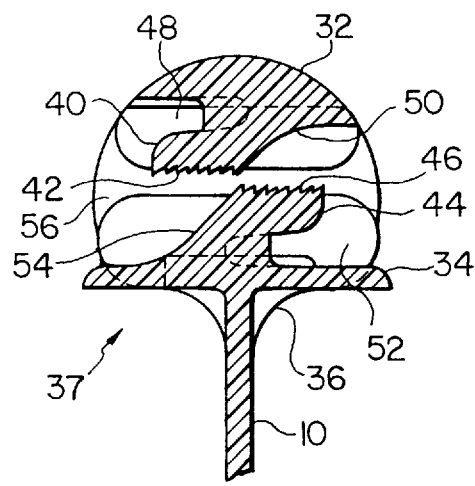
FIG. 4 is an enlarged sectional view taken along line 4—4 of FIG. 3.

As seen in FIG. 4, head 30 includes a bottom wall 34 from the midpoint of which downwardly extends strap 10. One or more reinforcing flanges 36 are formed between bottom wall 34 and strap 10 to allow strap 10 to be flexed either to the left or to the right as viewed in FIG. 4.

As indicated in FIG. 1, head 30 includes an aperture 38 formed in the central portion thereof. Aperture 38 is located between top wall 32 and bottom wall 34. Aperture 38, since it extends through head 30, defines a pair of openings 37 and 39 (FIG. 4) which may accept strap 10 in either a clockwise or counterclockwise direction, respectively, through head 30, in a manner to be described in greater detail hereinafter.

As seen in FIG. 4, extending downwardly and forwardly from top wall 32 within aperture 38 is an upper tongue 40. Tongue 40 includes teeth 42 formed on the lower surface thereof which are designed to be engaged by serrations 22. Extending upwardly and rearwardly from bottom wall 34 within aperture 38 is a lower tongue 44 having teeth 46 formed on the upper surface thereof. Teeth 46 are likewise designed to engage serrations 22.

Upper tongue 40 preferably includes an undercut portion 48 and a tapered rear wall 50 so that upper tongue 40 may flex upwardly as viewed in FIG. 4. Similarly, lower tongue 44 preferably includes an undercut portion 52 and a tapered rear wall 54 which together permit lower tongue 44 to flex downwardly again as shown in FIG. 4. As seen in FIGS. 1 and 4, a pair of guide slots 56 and 58 are formed in the side walls of aperture 38 and are sized to receive guide rails 24 and 26 therebetween.

In accordance with one aspect of the present invention, a pair of substantially identical mounting feet 60 extend from the bottom surface 62 of shoulders 31 and 33 of head 30.

The provision of unipartite, integrally extending mounting feet 60 permits the locking strap of the present invention to be attached to a support member without the need for any auxiliary parts whatsoever. More specifically, each foot 60 comprises a substantially cylindrical, reduced diameter base 64. Extending from the base 64 of each foot is an increased diameter, ball portion 66, having outwardly curved surfaces. Each ball portion 66 preferably includes a longitudinal slot 70 extending from the tip thereof preferably partially into the base 64. Slot 70 creates a pair of toes 65 and 67 which are symmetrical and substantially identical to one another. Due to the presence of slot 70, toes 65 and 67 flex towards one another as the ball portion 66 is inserted through a preformed hole or aperture in a support member (not shown in these views). The transition between reduced diameter base 64 and ball 66 is defined by a lip 68 which snaps into place as the ball portion 66 is inserted through the preformed aperture (not shown). This action secures the toes 65 & 67 of feet 60 into position and, hence, secures head 30 adjacent the support member as desired.

Figure 5:
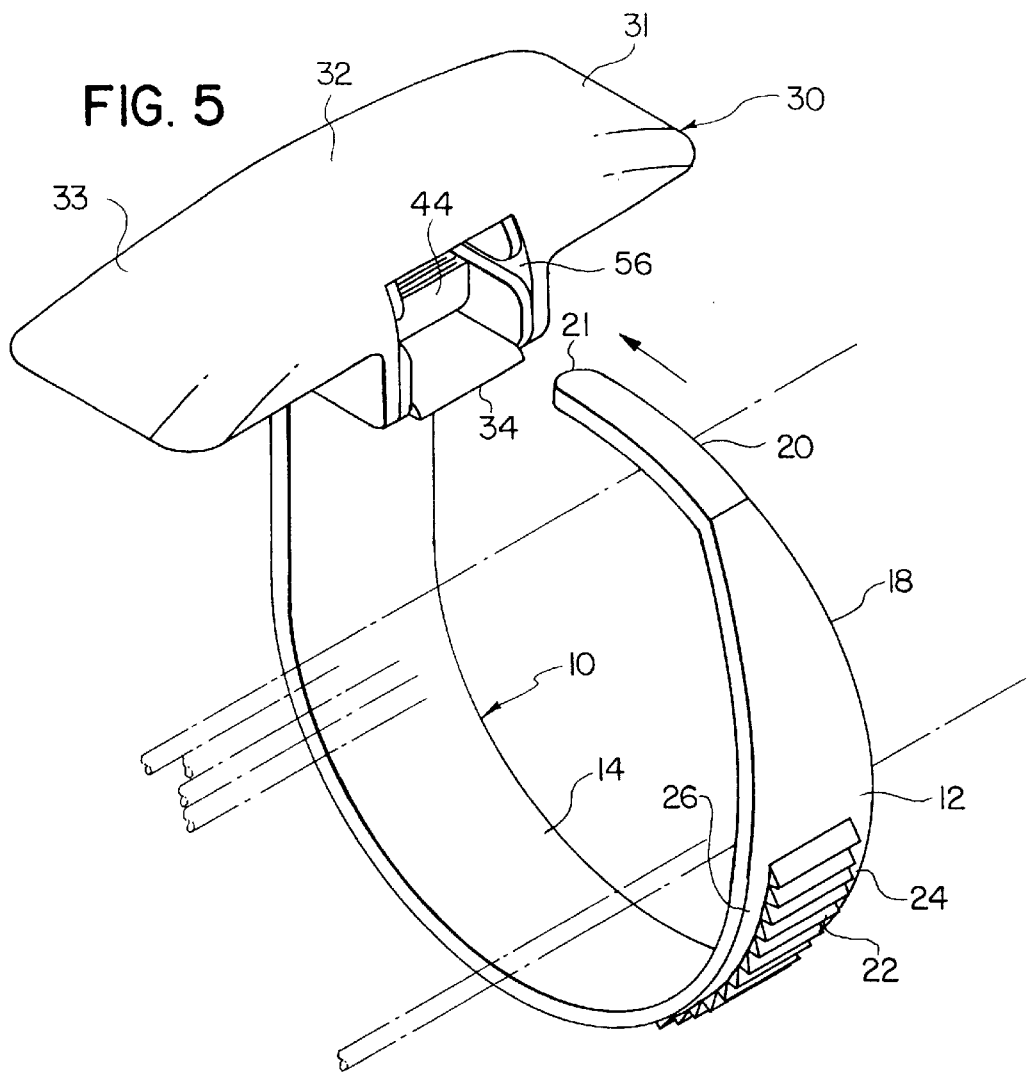
FIG. 5 is an enlarged, perspective, schematic view illustrating one possible mode of operation of the preferred embodiment of FIG. 1.

Referring now to FIG. 5, the first embodiment of the present invention is illustrated with strap 10 being inserted in the so-called counterclockwise direction through head 30 so as to encircle and clamp a bundle of wires indicated generally by the reference letter B. In this mode of operation, free end 21 is inserted through opening 39 which results in serrations 22 being located on the outside or front surface 12 of strap 10. Guide rails 24 and 26 are received within guide slots 56 and 58 so as to direct serrations 22 past teeth 42 of upper tongue 40. When strap 10 is released, serrations 22 will be engaged by teeth 42 so as to lock strap 10 in place. Strap 10 may be tightened as desired by continuing to draw strap 10 through opening 39 in the direction indicated in FIG. 6 (counterclockwise). It is noted that teeth 46 on lower tongue 44 offer no resistance to the movement of strap 10 therethrough since the back side 14 of strap 10 includes no serrations formed therein.

Figure 7:
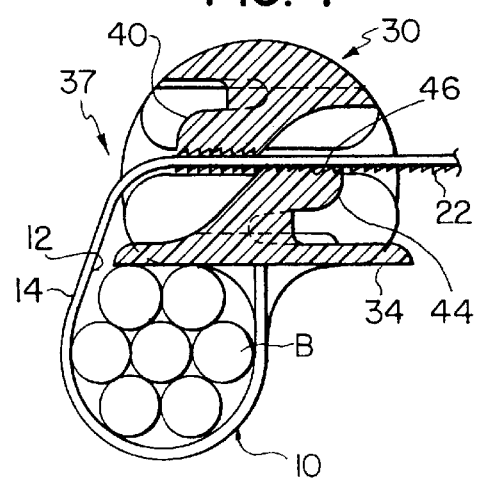
FIG. 7 is a view similar to FIG. 6 but illustrating an alternate mode of operation of the preferred embodiment of the present invention.

In the event that it is desired to draw strap 10 through head 30 in a clockwise direction, the same is illustrated in FIG. 7. When free end 21 of strap 10 is inserted through opening 37 of head 30, serrations 22 are located on the inside or front surface 12 of strap 10 so as to be drawn past teeth 46 of lower tongue 44. When strap 10 is released, teeth 46 of tongue 44 will engage serrations 22 so as to lock strap 10 in place. Since the back side 14 of strap 10 includes no serrations thereon, teeth 42 of upper tongue 40 offer no resistance to the movement of strap 10 therepast.

Figure 6:
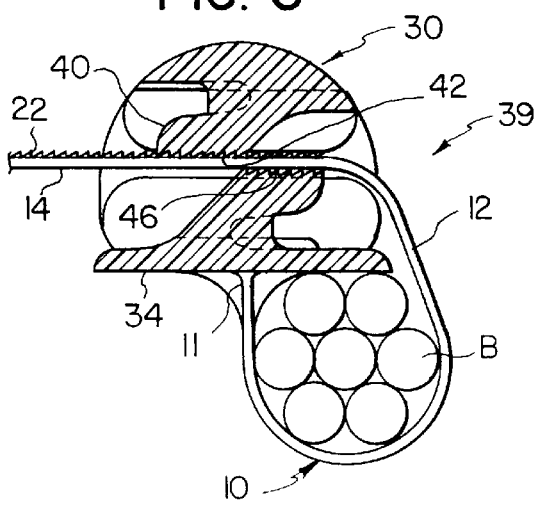
FIG. 6 is a cross-sectional view similar to FIG. 4 illustrating a further sequence in the mode of operation illustrated in FIG. 5.

FIGS. 6 and 7 illustrate the dual modes of operation of the present invention wherein stop 10 may be placed through aperture 38 in either a counterclockwise (FIG. 6) or clockwise (FIG. 7) direction with equal facility. The attachment of the secured end 11 of strap 10 at the approximate midpoint of lower wall 34 is one of the features that permits strap 10 to be drawn through either opening 37 or 39, as may be desired, with equal facility. In addition, the ability of tongues 40 and 42 to flex upwardly and downwardly, respectively, permits strap 10 to be drawn through head 30 quite tightly. Further, the provision of both upper and lower tongues 40 and 44 in the same unit renders the strap clamp of this embodiment more tamper-proof than would otherwise be the case. Further, the width and height of the guide slots 56 and 58 is such that side rails 24 and 26 fit snugly therewithin so as to further inhibit someone from tampering with serrations 22 once the strap clamp has been locked in place.

FIG. 8 illustrates the present invention, comprising head 30 and strap 10, bundling a plurality of wires B and also mounted to a tubular support member 80 having an opening 82 formed therein. Locking feet 60 are inserted into preformed apertures 81 to maintain head 30 in position on tubular support member 80.

FIGS. 9 and 10 illustrate an alternate embodiment of the present invention wherein head 30' includes no shoulders as with the first embodiment and, consequently, no mounting feet. Otherwise, the structure of the embodiment of FIGS. 9 and 10 is substantially identical to the first embodiment. The reduced size of head 30' is designed for installations where space is at a premium and which do not require mounting of the strap clamp to a surface or tubular support member.

Figure 13:
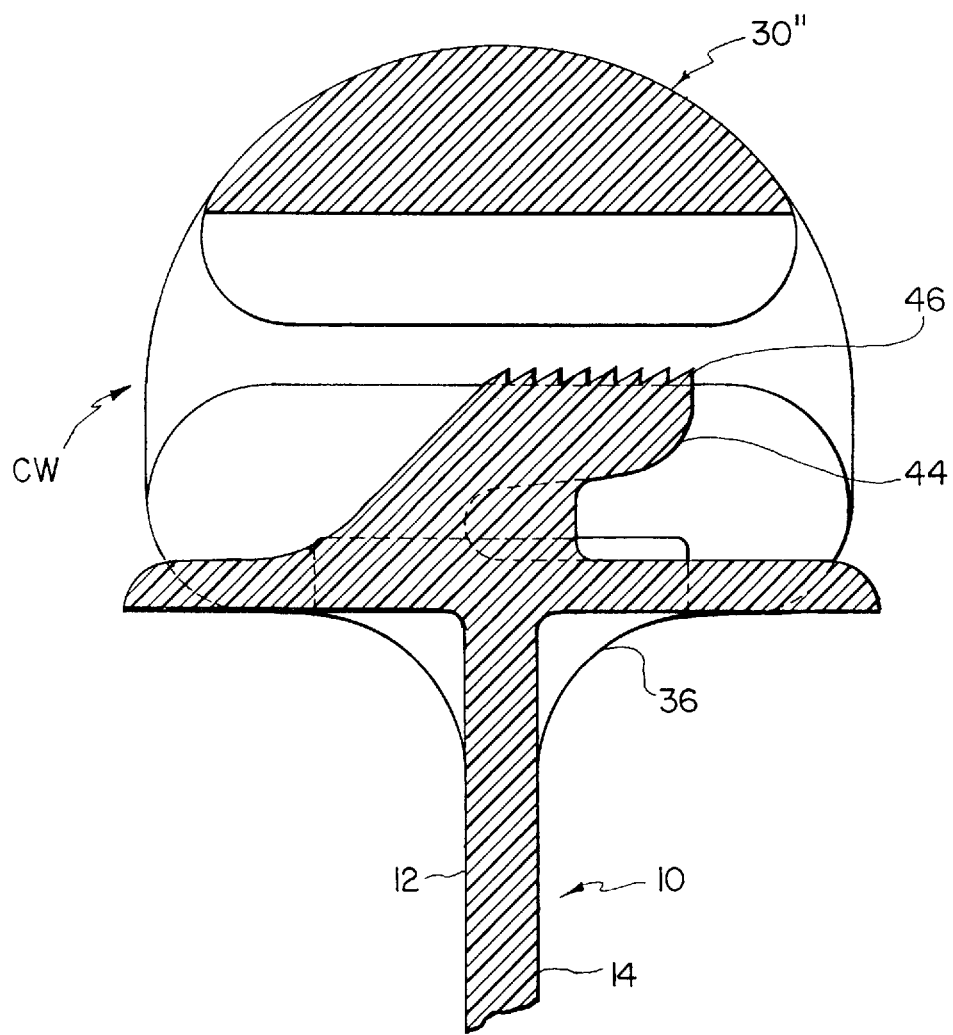
FIG. 13 is an enlarged sectional view taken along line 13—13 of FIG. 11.

FIGS. 11 through 13 illustrate an alternate embodiment of the present invention which comprises a head 30" that is shaped like that of the first embodiment but which, however, includes only a lower tongue 44 therewithin. This embodiment requires strap 10 to be placed into head 30" in a clockwise direction (from the left as viewed in FIG. 13) so that the serrations 22 formed on the outer surface 12 will be engaged by teeth 46 of the tongue member 44.

It may therefore be appreciated that the present invention provides a one-piece flexible strap clamp which may be wrapped in either of two directions about barriers, or about objects of varying shape such as insulators or lugs, or around fences, or about linear objects such as cable, wire, or bundles of cable or wire. The clamp may be installed onto a variety of support surfaces, such as underground support arms, wildlife/animal barriers, dielectric covers, or tubular guards, without the need for any additional fasteners or other mounting equipment or pieces, and is more tamper proof than previous versions.

Obviously, numerous modifications and variations of the present invention are possible in light of the above teachings. It is therefore to be understood that within the scope of the appended claims, the invention may be practiced otherwise than as specifically described herein.

We claim as our invention:

1. A one-piece strap clamp, which comprises:
   (a) an elongated strap having a front side, a back side, a secured end and a free end;
   (b) serrations formed on said front side only of said strap;
   (c) a head connected to said secured end of said strap and having an aperture formed therethrough to define first and second openings therein; and
   (d) means formed in said head for securing said strap to said head when said free end of said strap is inserted either through said first opening or said second opening,
   (e) wherein said aperture includes a top wall and a bottom wall and said means comprises locking means formed in said aperture for interlocking with said serrations whether said strap is inserted through said first opening or said second opening; and
   (f) wherein said locking means comprise first and second tongues extending respectively from said top wall and said bottom wall of said aperture in said head, each of said tongues including teeth formed thereon.

2. A one-piece strap clamp as set forth in claim 1, wherein said first and second openings are formed on opposite sides of said head.

3. A one-piece strap clamp as set forth in claim 1, wherein said first and second openings comprise the opposite ends of said aperture.

4. A one-piece strap clamp as set forth in claim 1, wherein said teeth are formed on the lower surface of said first tongue and the upper surface of said lower tongue.

5. A one-piece strap clamp as set forth in claim 4, wherein said first tongue extends downwardly and rearwardly from said top wall and includes means for enabling same to flex upwardly.

6. A one-piece strap clamp as set forth in claim 5, wherein said second tongue extends upwardly and forwardly from said bottom wall and includes means for enabling same to flex downwardly.

7. A one-piece strap clamp, which comprises:
   (a) an elongated strap having a front side, a back side, a secured end and a free end;
   (b) serrations formed on said front side only of said strap;
   (c) a head connected to said secured end of said strap and having an aperture formed therethrough to define first and second openings therein, said aperture having a top wall and a bottom wall;

(c) means formed in said head for securing said strap to said head when said free end of said strap is inserted only through said first opening;

(e) wherein said means comprises a tongue extending from said bottom wall, said tongue including teeth formed thereon;

(d) wherein said teeth are formed on the upper surface of said tongue; and (e) wherein said tongue extends upwardly and forwardly from said bottom wall and includes means for enabling same to flex downwardly.

8. A one-piece strap clamp for a cable or other body, which comprises:

means for encircling said cable or other body, said means including a flexible strap and a head including aperture means for receiving and locking said strap;

means extending integrally from said head for allowing said encircling means to be secured to a support member without the need for any additional parts;

wherein said flexible strap includes a front side, a back side, a secured end and a free end, and wherein serrations are formed on said front side any of said strap and said aperture means define first and second openings therein, said aperture having a to wall and a bottom wall, and further including means formed in said head for securing said strap to said head when said free end of said strap is inserted only through said first opening; and wherein said means formed in said head comprises a tongue extending upwardly and forwardly from said bottom wall for enabling same to flex downwardly, said tongue including teeth formed on the upper surface of said tongue.

9. A one-piece strap clamp for a cable or other body, which comprises:

means for encircling said cable or other body, said means including a flexible strap and a head including aperture means for receiving and locking said strap;

means extending integrally from said head for allowing said encircling means to be secured to a support member without the need for any additional parts;

wherein said means for allowing said encircling means to be secured to a support member comprises mounting foot means extending integrally from said head and adapted for insertion through mounting opening means formed in said support member; and wherein said mounting foot means comprises a base portion extending from said head and a ball portion connected to said base portion and adapted to be inserted through said mounting opening means.

10. A one-piece strap clamp for a cable or other body as set forth in claim 9, wherein said base portion is substantially cylindrical and is of a diameter which is less than that of said ball portion.

11. A one-piece strap clamp for a cable or other body as set forth in claim 10, further comprising slot means formed in said base and ball portions for creating a pair of toe portions adapted to resiliently flex towards one another as said ball portion is inserted through said mounting hole means.

12. A one-piece strap clamp for a cable or other body as set forth in claim 11, wherein said mounting foot means comprises first and second substantially similar mounting feet located at spaced locations on said head.

13. A one-piece strap clamp for a cable or other body as set forth in claim 12, wherein said head includes a pair of shoulders extending laterally along both sides of said aperture, and said spaced locations are located one on the underside of each of said shoulders.

14. A one-piece strap clamp for a cable or other body, which comprises:

means for encircling said cable or other body, said means including a flexible strap and a head including aperture means for receiving and locking said strap;

means extending integrally from said head for allowing said encircling means to be secured to a support member without the need for any additional parts;

wherein said flexible strap has a front side, a back side, a secured end, a free end, and serrations formed on said front side only of said strap; said head connected to said secured end of said strap, said aperture means comprising an aperture formed therethrough to define first and second openings therein, and means formed in said head for securing said strap to said head when said free end of said strap is inserted either through said first opening or said second opening;

wherein said first and second openings are formed on opposite sides of said head;

wherein said head includes a top wall and a bottom wall and said means formed in said head comprises locking means formed in said aperture for interlocking with said serrations whether said strap is inserted through said first opening or said second opening; and wherein said locking means comprise first and second tongues extending respectively from said top wall and said bottom wall of said aperture in said head, each of said tongues including teeth formed thereon.

15. A one-piece strap clamp for a cable or other body as set forth in claim 14, wherein said teeth are formed on the lower surface of said first tongue and the upper surface of said lower tongue.

16. A one-piece strap clamp for a cable or other body as set forth in claim 15, wherein said first tongue extends downwardly and rearwardly from said top wall and includes means for enabling same to flex upwardly, and said second tongue extends upwardly and forwardly from said bottom wall and includes means for enabling same to flex downwardly.

\* \* \* \* \*